(12) United States Patent
Tsai et al.

(10) Patent No.: US 9,257,904 B2
(45) Date of Patent: Feb. 9, 2016

(54) DIRECT CURRENT CONVERSION CIRCUIT

(71) Applicant: INDUSTRIAL TECHNOLOGY RESEARCH INSTITUTE, Hsinchu (TW)

(72) Inventors: Wen-Tien Tsai, Pingtung County (TW); Ching-Ran Lee, Kinmen County (TW); Po-Yen Chen, Taipei (TW); Ching-Tsai Pan, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 230 days.

(21) Appl. No.: 13/937,685

(22) Filed: Jul. 9, 2013

(65) Prior Publication Data

US 2014/0139128 A1     May 22, 2014

(30) Foreign Application Priority Data

Nov. 16, 2012   (TW) .............................. 101142995 A

(51) Int. Cl.
*G05F 1/00* (2006.01)
*G05F 1/40* (2006.01)
*H02M 3/335* (2006.01)
(Continued)

(52) U.S. Cl.
CPC ...... *H02M 3/155* (2013.01); *H02M 2001/0058* (2013.01); *Y02B 70/1491* (2013.01)

(58) Field of Classification Search
CPC ........... G05F 1/00; H02M 3/335; H05B 37/00
USPC ............. 315/209, 307, 244, 209 R, 247, 224; 363/81, 89, 132, 198, 34, 37, 39, 47, 363/98
See application file for complete search history.

(56) References Cited

U.S. PATENT DOCUMENTS 5,694,302 A    12/1997   Faulk
5,783,933 A *   7/1998   Bailly ........................... 323/282
(Continued)

FOREIGN PATENT DOCUMENTS

CN        1265479 A     9/2000
CN     102195481 A     9/2011
(Continued)

OTHER PUBLICATIONS

Intellectual Property Office, Ministry of Economic Affairs, R.O.C., "Office Action", Jun. 11, 2014. Taiwan.
(Continued)

*Primary Examiner* — Jimmy Vu
*Assistant Examiner* — Wei Chan
(74) *Attorney, Agent, or Firm* — Locke Lord LLP; Tim Tingkang Xia, Esq.

(57) ABSTRACT

A direct current (DC) conversion circuit suitable for driving a load comprises a buck-boost converter, a resonant stage circuit and an output stage circuit. The buck-boost converter has two input ends receiving a first DC signal, and two output ends outputting a second DC signal. The resonant stage circuit has two input ends receiving the second DC signal. The resonant stage circuit converts the second DC signal to energy and further converts the energy to a negative voltage by a resonance effect. The resonant stage circuit has two input ends outputting the energy. The output stage circuit has two input ends receiving the energy to store the energy, and two output ends outputting energy to the load.

17 Claims, 11 Drawing Sheets

(51) Int. Cl.
  *H02M 3/155* (2006.01)
  *H02M 1/00* (2007.01)

(56) References Cited

U.S. PATENT DOCUMENTS

| | | | | |
|---|---|---|---|---|
| 6,034,489 | A | * | 3/2000 | Weng ............................ 315/307 |
| 6,661,683 | B2 | | 12/2003 | Botker et al. |
| 7,456,583 | B2 | * | 11/2008 | Yao et al. ...................... 315/224 |
| 7,511,563 | B2 | | 3/2009 | Botker et al. |
| 7,742,318 | B2 | * | 6/2010 | Fu .................... H02M 3/33592 363/16 |
| 7,973,487 | B2 | | 7/2011 | Vaucourt et al. |
| 7,977,927 | B2 | | 7/2011 | Williams |
| 8,013,666 | B1 | | 9/2011 | Liu |
| 8,184,456 | B1 | * | 5/2012 | Jain et al. ................... 363/21.02 |
| 2003/0001522 | A1 | * | 1/2003 | Newman et al. .............. 315/291 |
| 2005/0212458 | A1 | * | 9/2005 | Powers et al. ................ 315/291 |
| 2007/0040516 | A1 | * | 2/2007 | Chen ................... H05B 39/045 315/291 |
| 2007/0236968 | A1 | | 10/2007 | Wu et al. |
| 2012/0153854 | A1 | * | 6/2012 | Setomoto et al. ......... 315/200 R |

FOREIGN PATENT DOCUMENTS

| | | |
|---|---|---|
| TW | 201106594 A | 2/2011 |
| TW | I337795 B | 2/2011 |
| TW | 201108574 A | 3/2011 |
| TW | I343695 B | 6/2011 |
| TW | I358884 B | 2/2012 |
| TW | M437003 | 9/2012 |

OTHER PUBLICATIONS

W.T. Tsai et al., An Electronic Ballast with Multi-Step Constant-Power Starting Control for Small-Wattage Metal Halide Lamps, IEEE, 1221-1226, (2011).

Chi-Hao Wu et al., A Low-Ripple Charge Pump with Continuous Pumping Current Control, IEEE, 2008, p. 722-725.

F. Bedeschi et al., A Low-Ripple Voltage Tripler, ISCAS IEEE, 2006, p. 2753-2756.

Fu Cong et al., A Novel Low-Ripple Charge Pump for PCM, IEEE, 2011, p. 322-324.

A. Rao et al., Buck-Boost Switched-Capacitor DC-DC Voltage Regulator Using Delta-Sigma Control Loop, IEEE, 2002, IV-743-746.

Ebrahim Babaei et al., Operational Modes and Output-Voltage-Ripple Analysis and Design Considerations of Buck-Boost DC-DC Converters, IEEE Transactions on Industrial Electronics, 2012, p. 381-391, vol. 59, No. 1.

State Intellectual Property Office of the P. R. C, "Office Action", Sep. 30, 2015, China.

Hu, Xuefeng, Research on a Novel Buck-PFC Converter, 2007, 68-71.

* cited by examiner

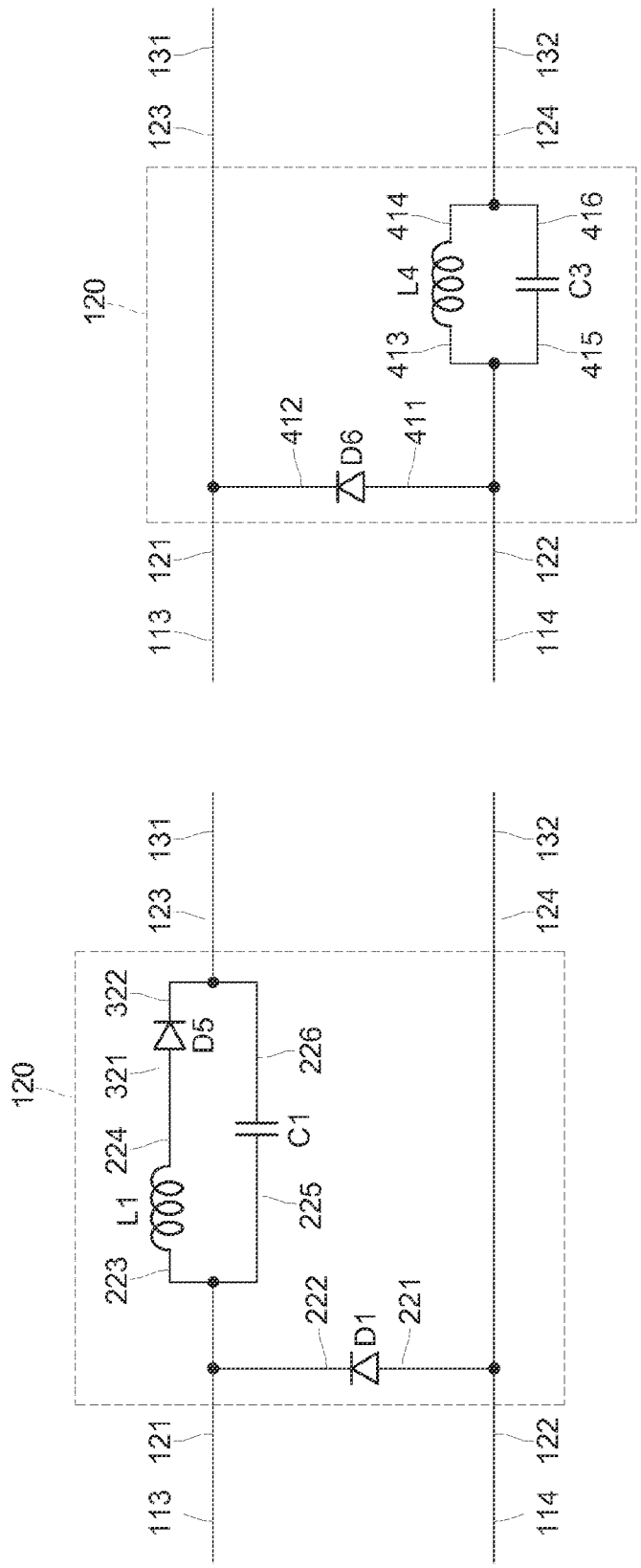

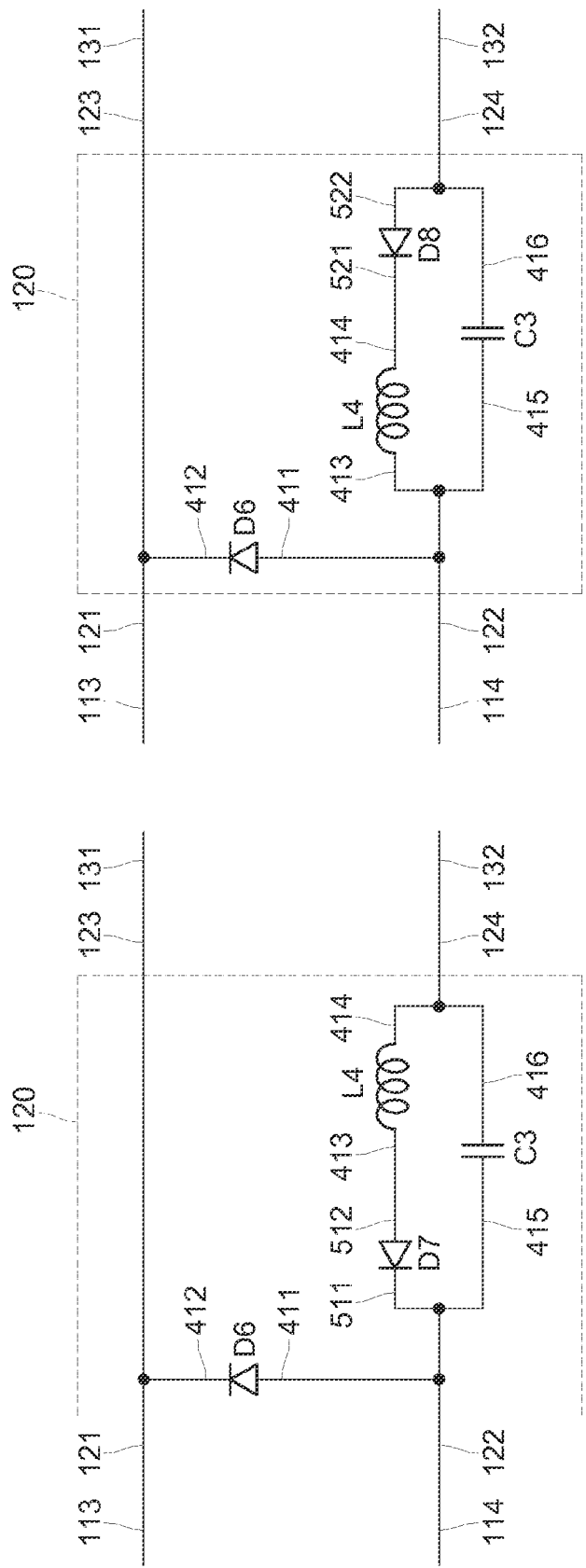

US 9,257,904 B2

DIRECT CURRENT CONVERSION CIRCUIT

CROSS-REFERENCE TO RELATED APPLICATIONS

This non-provisional application claims priority under 35 U.S.C. §119(a) on Patent Application No(s). 101142995 filed in Taiwan, R.O.C. on Nov. 16, 2012, the entire contents of which are hereby incorporated by reference.

TECHNICAL FIELD

The disclosure relates to a direct current conversion circuit.

BACKGROUND

Generally speaking, a direct current (DC) conversion circuit is disposed with an energy storage element. The inductance value of the energy storage element affects the response speed of the input current and the output voltage ripple in the DC conversion circuit. If the inductance value of the energy storage element is relatively smaller, the response speed of the input current of the DC conversion circuit is relatively faster, but the output voltage ripple is relatively larger. On the contrary, if the inductance value of the energy storage element is relatively larger, the response speed of the input current of the DC conversion circuit is relatively slower, but the output voltage ripple is relatively smaller.

Therefore, for general DC conversion circuits, usually inductors with relatively smaller inductance values and capacitors with relatively larger capacitance value are employed. In other words, the energy storage element with a relatively smaller inductance value and a relatively larger capacitance value is employed. Thus, the DC conversion circuit can have a relatively faster response speed of the input current and a relatively smaller output current ripple. Furthermore, an electrolytic capacitor is usually employed as the capacitor with a relatively larger capacitance value, so as to achieve the relatively faster response speed and the relatively smaller output current ripple.

However, because an electrolytic capacitor is easily affected by external circumstances and factors such as the operation of switch and temperature, the electrolytic capacitor has a shorter life expectancy than other types of capacitors made of different materials. As a result, the life expectancy of the DC conversion circuit is also shortened.

SUMMARY

A direct current (DC) conversion circuit of the disclosure, adapted to drive a load which comprises a light emitting diode (LED) or an organic solid-state lighting. The DC conversion circuit comprises a buck-boost converter, a resonant stage circuit and an output stage circuit. The buck-boost converter has two input ends, a negative output end and a positive output end. The two input ends of the buck-boost converter are used for receiving a first DC signal, and the negative and positive output ends of the buck-boost converter are used for outputting a second DC signal. The resonant stage circuit is used for receiving the second DC signal via its two input ends, converting the second DC signal to energy, and outputting the energy via its two output ends, and further used for converting the energy to a negative voltage through a resonance effect and outputting the energy via its two output ends. The output stage circuit has two input ends and two output ends. The output stage circuit is used for receiving the energy via its two input ends to store the energy and perform power charging, in order to output the energy to the load by its two output ends.

BRIEF DESCRIPTION OF THE DRAWINGS

The disclosure will become more fully understood from the detailed description given herein below for illustration only, and thus is not limitative of the disclosure, and wherein:

FIG. 3B is a schematic diagram of a resonant stage circuit according to an embodiment of the disclosure.

FIG. 4 is a schematic diagram of a resonant stage circuit according to an embodiment of the disclosure;

FIG. 5A is a schematic diagram of a resonant stage circuit according to an embodiment of the disclosure;

FIG. 5B is a schematic diagram of a resonant stage circuit according to an embodiment of the disclosure;

DETAILED DESCRIPTION

Figure 1:
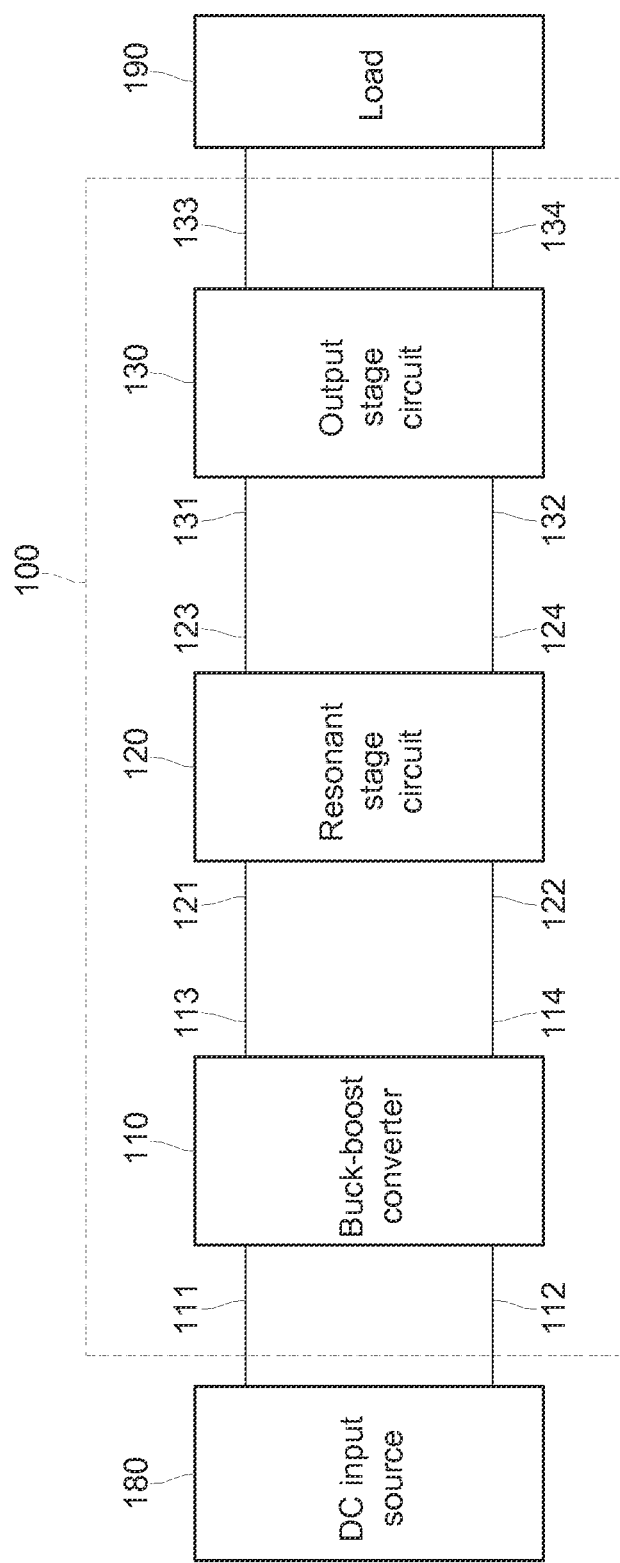
FIG. 1 is a schematic diagram of a DC conversion circuit according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In each embodiment mentioned hereinafter, the same label is used for representing the same or similar elements.

FIG. 1 is a schematic diagram of a direct current (DC) conversion circuit according to a first embodiment of the disclosure. A DC conversion circuit 100 of this embodiment is used for coupling with a load 190 in order to supply an operating voltage to the load 190. For the load 190, the current passing through the load 190 is sensitive to the voltage flicker of the DC conversion circuit 100. The load 190 can be, for example, a light emitting diode (LED) or an organic solid-state lighting.

The DC conversion circuit 100 comprises a buck-boost converter 110, a resonant stage circuit 120 and an output stage circuit 130. The buck-boost converter 110 has two input ends 111 and 112 and two output ends 113 and 114. The two input ends 111 and 112 of the buck-boost converter 110, for example, are coupled to a DC input source 180 for receiving a first DC signal outputted by the DC input source 180. The buck-boost converter 110 processes the first DC signal and outputs a second DC signal by the two output ends 113 and 114 of the buck-boost converter 110. In this embodiment, the DC input source 180, for examples, is a pulse power source or a DC power source. More specifically, the DC power source can also include a DC voltage source or a DC current source.

The resonant stage circuit 120 has two input ends 121 and 122 and two output ends 123 and 124. The two input ends 121 and 122 of the resonant stage circuit 120 are coupled to the output ends 113 and 114 of the buck-boost converter 110. The resonant stage circuit 120 receives the second DC signal via the two input ends 121 and 122 of the resonant stage circuit 120 and converts the second DC signal to energy. Then, the resonant stage circuit 120 outputs the energy via the two output ends 123 and 124 of the resonant stage circuit 120. Further, the resonant stage circuit 120 converts the energy to a negative voltage via a resonance effect and outputs the energy via the two output ends 123 and 124 of the resonant stage circuit 120.

The output stage circuit 130 has two input ends 131 and 132 and two output ends 133 and 134. The two input ends 131 and 132 of the output stage circuit 130 are coupled to the two output ends 123 and 124 of the resonant stage circuit 120. The output stage circuit 130 receives the energy via the two input ends 131 and 132 of the output stage circuit 130 to store the energy and perform power charging. Then, the output stage circuit 130 outputs the energy to the load 190 via the two output ends 133 and 134 of the output stage circuit 130.

Firstly, when the DC conversion circuit 100 starts to operate, the buck-boost converter 110 converts the received first DC signal into the second DC signal by a switching operation. The second DC signal is outputted to the resonant stage circuit 120, so as to increase the voltage of the resonant stage circuit 120 speedily, and to simultaneously transmit energy to the output stage circuit 130 and the load 190. When the second DC signal disables, by the resonance effect, the energy stored in the resonant stage circuit 120 is converted into an inductive current, and then is outputted to the output stage circuit 130. This may suppress the output current ripple when the input energy is increased.

When the energy stored in the resonant stage circuit 120 is converted into the inductive current, the polarity of the voltage between the input and output of the resonant stage circuit 120 is reversed so as to form a negative voltage. Herein, the circuit structure of the DC conversion circuit 100 is changed. Moreover, the energy is transmitted to the load 190 via the resonant stage circuit 120 and the output stage circuit 130 to supply an operating voltage to the load 190. The resonant stage circuit 120 and the output stage circuit 130 cooperate as a filter circuit element for suppressing the output current ripple when the input energy is disabled. Therefore, the DC conversion circuit 100 of this embodiment may have the fast input response, a smaller output current ripple and a longer life.

Figure 2A:
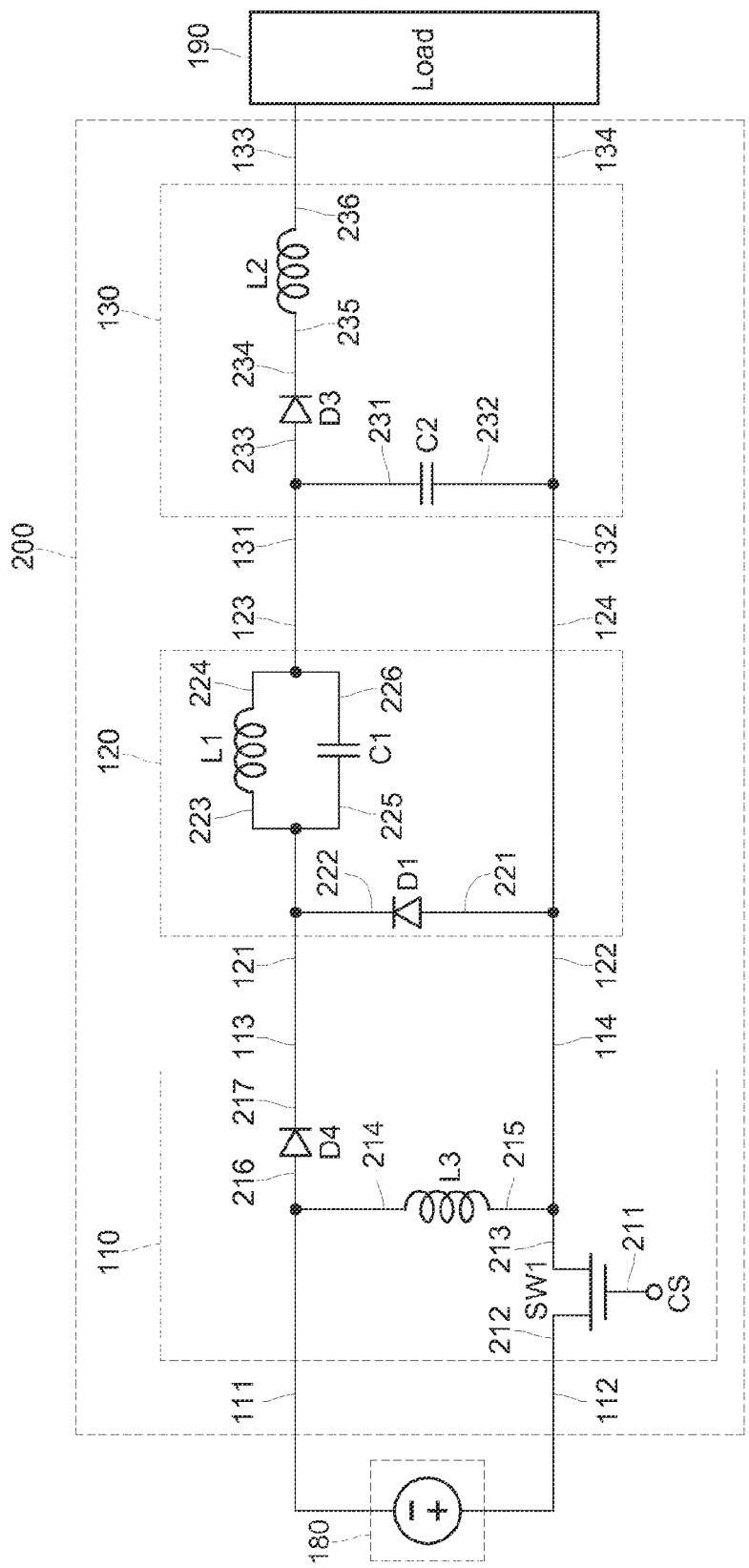
FIG. 2A is a schematic diagram of a DC conversion circuit according to a second embodiment of the disclosure.

FIG. 2A is a schematic diagram of a DC conversion circuit according to a second embodiment of the disclosure. The DC input source 180 in this embodiment, for example, is a DC voltage source. The positive end of the DC voltage source is coupled to the input end 112 of the buck-boost converter 110, and the negative end of the DC voltage source is coupled to the input end 111 of the buck-boost converter 110. In this embodiment, the DC input source 180 can also be a DC current source.

A DC conversion circuit 200 comprises the buck-boost converter 110, the resonant stage circuit 120 and the output stage circuit 130. The buck-boost converter 110 comprises a switch SW1, a third inductor L3 and a fourth diode D4. The switch SW1 has a first end 211, a second end 212 and a third end 213. The first end 211 of the switch SW1 receives a control signal CS. The second end 212 of the switch SW1 is coupled to one of the two input ends 111 and 112 of the buck-boost converter 110, i.e. the input end 112 of the buck-boost converter 110. The third end 213 of the switch SW1 is coupled to the output end 114 of the buck-boost converter 110.

In this embodiment, the switch SW1, for example, is an N-type transistor. The first end 211, the second end 212 and the third end 213 of the switch SW1 are a gate end, a drain end and a source end of the N-type transistor respectively. In some embodiments, the switch SW1 can also be a P-type transistor or other switch elements.

The third inductor L3 has a first end 214 and a second end 215. The first end 214 of the third inductor L3 is coupled to the other one of the two input ends 111 and 112 of the buck-boost converter 110, i.e. the input end 111 of the buck-boost converter 110, and the second end 215 of the third inductor L3 is coupled to the third end 213 of the switch SW1.

The fourth diode D4 has an anode end 216 and a cathode end 217. The anode end 216 of the fourth diode D4 is coupled to the first end 214 of the third inductor L3. The cathode end 217 of the fourth diode D4 is coupled to the output end 113 of the buck-boost converter 110.

The resonant stage circuit 120 comprises a first diode D1, a first inductor L1 and a first capacitor C1. The first diode D1 has an anode end 221 and a cathode end 222. The anode end 221 of the first diode D1 is coupled to the output end 114, i.e. a negative output end, of the buck-boost converter 110 and the input end 122 of the resonant stage circuit 120. The cathode end 222 of the first diode D1 is coupled to the output end 113, i.e. a positive output end, of the buck-boost converter 110 and the input end 121 of the resonant stage circuit 120.

The first inductor L1 has a first end 223 and a second end 224. The first end 223 of the first inductor L1 is coupled to the cathode end 222 of the first diode D1. The second end 224 of the first inductor L1 is coupled to the output end 123 of the resonant stage circuit 120. The first capacitor C1 has a first end 225 and a second end 226. The first end 225 of the first capacitor C1 is coupled to the cathode end 222 of the first diode D1. The second end 226 of the first capacitor C1 is coupled to the second end 224 of the first inductor L1. In other words, the first capacitor C1 and the first inductor L1 are connected in parallel. The first inductor L1 and the first capacitor C1 cooperate to form, for example, a resonant circuit. In this embodiment, the output end 124 of the resonant stage circuit 120 is directly coupled to the input end 122 of the resonant stage circuit 120.

The output stage circuit 130 comprises a second capacitor C2, a third diode D3 and a second inductor L2. The second capacitor C2 has a first end 231 and a second end 232. The first end 231 of the second capacitor C2 is coupled to the output end 123 of the resonant stage circuit 120 and the input end 131 of the output stage circuit 130. The second end 231 of the second capacitor C2 is coupled to the output end 124 of the resonant stage circuit 120 and the input end 132 of the output stage circuit 130.

The third diode D3 has an anode end 161 and a cathode end 162. The anode end 161 of the third diode D3 is coupled to the first end 151 of the second capacitor C2. The second inductor L2 has a first end 171 and a second end 172. The first end 171 of the second inductor L2 is coupled to the cathode 162 of the third diode D3. The second end 172 of the second inductor L2 is coupled to the output end 133 of the output stage circuit 130 and the load 190. In this embodiment, the output end 134 of the output stage circuit 130 is directly coupled to the input end 132 of the output stage circuit 130 and the load.

Firstly, when the DC conversion circuit 200 starts to operate, the buck-boost converter 110 converts the received first DC signal into the second DC signal by a switching operation. The second DC signal is outputted to the resonant circuit formed by the first inductor L1 and the first capacitor C1, so as to increase the voltage between the first and second ends 225 and 226 of the first capacitor C1 speedily, and to simultaneously transmit energy to the second capacitor C2 and the load 190. When the second DC signal disables, the energy stored in the first capacitor C1 is converted into an inductive current by the resonance effect of the first inductor L1 and the first capacitor C1, and charges the second capacitor C2. This may suppress the output current ripple when the input energy is increased.

When the energy stored in the first capacitor C1 is converted into the inductive current, the polarity of the voltage between the first and second ends 225 and 226 of the first capacitor C1 is reversed to form a negative voltage. Herein, the first diode D1 is conducted, so that the circuit structure of the DC conversion circuit 200 is changed. Moreover, the energy is transmitted to the load 190 via the first inductor L1, the first capacitor C1, the second capacitor C2 and the second inductor L2, to supply an operating voltage to the load 190. The first inductor L1, the first capacitor C1, the second capacitor C2 and the second inductor L2 cooperate as a filter circuit element for suppressing the output current ripple when the input energy is disabled. Therefore, the DC conversion circuit 200 of this embodiment may have the fast input response, a smaller output current ripple and a longer life.

The capacitance value of the first capacitor C1 can be designed to be smaller than that of the second capacitor C2, so that when the polarity of the voltage between the first and second ends 225 and 226 of the first capacitor C1 is reversed, the negative voltage between the first and second ends 225 and 226 of the first capacitor C1 will be larger than the voltage between the first and second ends 231 and 232 of the second capacitor C2. Herein, the first diode D1 will be turned on.

Operational Embodiment 1

Assume that the first inductor L1, the second inductor L2 and the third inductor L3 operate in a continuous conduction mode (CCM). Firstly, after the DC conversion circuit 200 starts to operate, the control signal CS at, for example, a high logic level ("1"). Herein, the switch SW1 is turned on, and the DC conversion circuit 200 enters into a first mode, and the first DC signal generated by the DC input source 180 is transmitted to the third inductor L3 via the switch SW1 in order to charge the third inductor L3. On the other hand, the second diode D2 is conducted, and the first inductor L1, the second inductor L2, the first capacitor C1 and the second capacitor C2 discharge the energy to the load 190 simultaneously.

Subsequently, the control signal CS is converted into a control signal of, for example, a low logic level ("0"), so that the switch SW1 is turned off and the DC conversion circuit 200 enters into a second mode. Herein, the fourth diode D4 and the third diode D3 are conducted, the stored energy of the third inductor L3 forms the second DC signal via the fourth diode D4. The second DC signal is transmitted to the resonant circuit formed by the first inductor L1 and the first capacitor C1, for charging the first inductor L1, the first capacitor C1 and the second capacitor C2. In other words, the second DC signal (i.e. the stored energy of the third inductor L3) carries the stored energy to the second capacitor C2 via the first inductor L1 and the first capacitor C1 speedily for effectively suppressing the output current ripple caused by the increased input energy.

When the energy stored in the first capacitor C1 is converted into the inductive current, the polarity of the voltage between the first and second ends 225 and 226 of the first capacitor C1 is reversed, and the negative voltage is formed. Herein, the first diode D1 is conducted, and then the circuit structure of the DC conversion circuit 200 is changed. When the first diode D1 is conducted, the DC conversion circuit 200 enters into a third mode. Herein, the first capacitor C1 and the first inductor L1 form a loop via the first diode D1. The first capacitor C1 and the first inductor L1 form another loop via the third inductor L3 and the fourth diode D4. The two loops cooperate with the second capacitor C2 and the second inductor L2 to transmit the stored energy to the load 190 for supplying the operating voltage to the load 190. Accordingly, the DC conversion circuit 200 has completed a full cycle of actions.

Operational Embodiment 2

Assume that the first inductor L1 and the second inductor L2 operate in a continuous conduction mode (CCM), and the third inductor L3 operates in a discontinuous conduction mode (DCM). The DC conversion circuit 200 in this operational embodiment 2 has the first mode, the second mode, the third mode and a forth mode. The first mode, the second mode and the third mode can refer to the operational embodiment 1, and therefore are not described herein again.

Then, when the energy storage voltage of the third inductor L3 has finished discharging, the DC conversion circuit 200 enters into the fourth mode. Herein, the first capacitor C1 and the first inductor L1 form a loop via the first diode D1, and the loop cooperates with the second capacitor C2 and the second inductor L2 to transmit the stored energy to the load 190 continuously for supplying the operating voltage to the load 190. Accordingly, the DC conversion circuit 200 has completed a full cycle of actions.

Operational Embodiment 3

Assume that the second inductor L2 is operated in a continuous conduction mode (CCM), and the first inductor L1 and the third inductor L3 are operated in a discontinuous conduction mode (DCM). The DC conversion circuit 200 in this operational embodiment 3 has the first mode, the second mode, the third mode, the forth mode and a fifth mode. The first mode, the second mode, the third mode and the forth mode can refer to the operational embodiments 1 and 2, and therefore are not described herein again.

When the energy stored in the resonant circuit formed by the first inductor L1 and the first capacitor C1 has been discharged completely, the DC conversion circuit 200 enters into the fifth mode. Herein, only the second capacitor C2 and the second inductor L2 transmit the stored energy to the load 190 continuously for supplying the operating voltage to the load 190. Accordingly, the DC conversion circuit 200 has completed a full cycle of actions. In this way, the DC conversion circuit 200 may have smaller output current ripples. This is illustrated below.

Figure 2B:
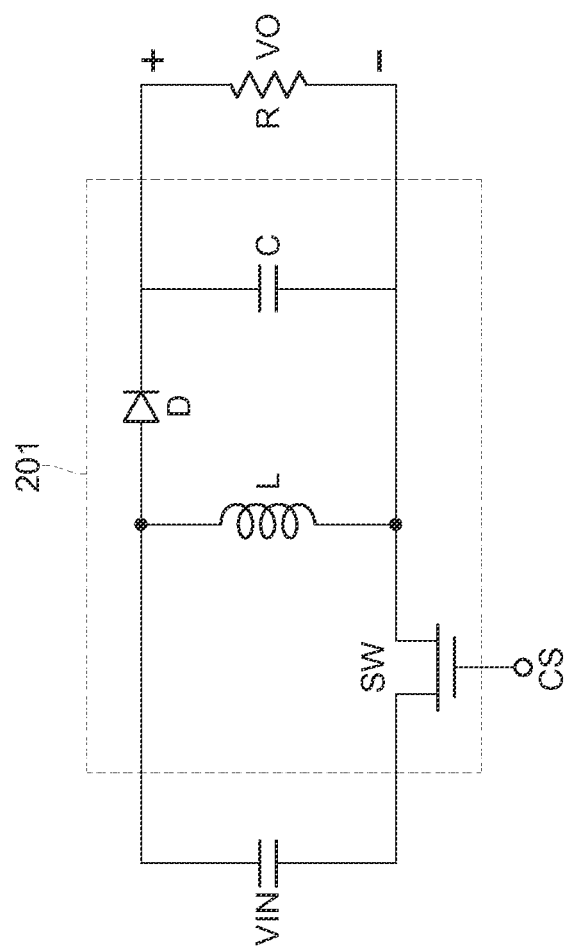
FIG. 2B is a schematic diagram of a DC conversion circuit.
Figure 2C:
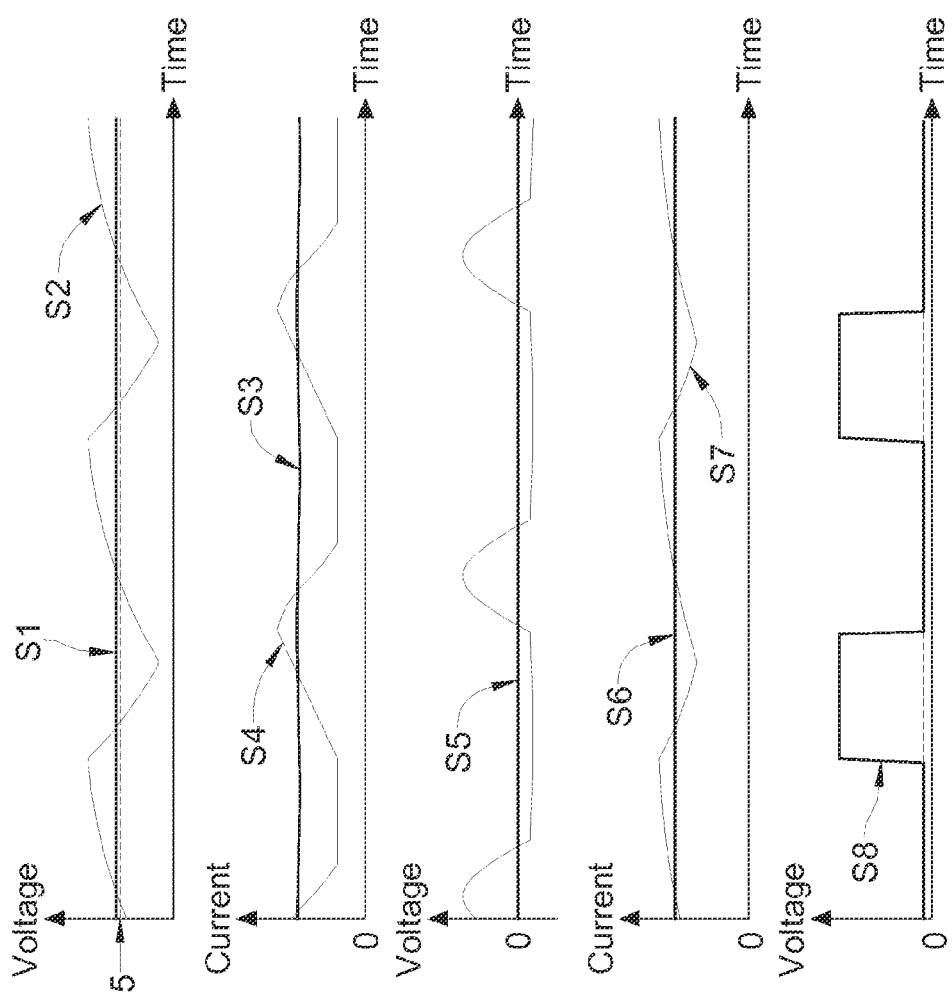
FIG. 2C is a simulation waveform diagram showing output currents, inductive currents, capacitor voltages, output voltages and a control signal implemented in the DC conversion circuits in FIG. 2A and FIG. 2B.

For instance, the operation difference between the DC conversion circuit 200 and a DC conversion circuit 201 in FIG. 2B is illustrated via information shown in FIG. 2C which shows output currents, inductive currents, capacitor voltages, output voltages and a control signal implemented in the DC conversion circuits in FIG. 2A and FIG. 2B. The DC conversion circuit 201 includes a switch SW, an inductor L, a capacitor C and a diode D. The DC conversion circuit 201 is supplied with a DC input source VIN and outputs an output voltage VO to a load, e.g. a resistance R.

In this example, circuit parameters for the DC conversion circuit 201 are listed in Table 1, and Circuit parameters for the DC conversion circuit 200 are listed in Table 2.

TABLE 1

|  | Values |
| --- | --- |
| Inductor | 264 uH |
| Capacitor | 1 uF |
| DC input source | 12 V |
| Output voltage | 5 V |
| Switch frequency of control signal | 100 KHz |

TABLE 2

|  | Values |
| --- | --- |
| Third inductor | 22 uH |
| First inductor | 22 uH |
| Second inductor | 220 uH |
| First capacitor | 0.1 uF |
| Second capacitor | 1 uF |
| DC input source | 12 V |
| Output voltage | 5 V |
| Switch frequency of control signal | 100 KHz |

In FIG. 2C, a curve S1 represents an output voltage outputted from the DC conversion circuit 200 to the load 190, a curve S2 represents an output voltage VO of the DC conversion circuit 201, a curve S3 represents an inductive current passing through the third inductor L3 in the DC conversion circuit 200, a curve S4 represents an inductive current passing through the inductor L in the DC conversion circuit 201, a curve S5 represents a capacitor voltage of the first capacitor C1 in the DC conversion circuit 200, a curve S6 represents an output current of the DC conversion circuit 200, a curve S7 represents an output current of the DC conversion circuit 201, and a curve S8 represents a control signal CS.

An output voltage ripple of the DC conversion circuit 200 is 0.021 V, and an output voltage ripple of the DC conversion circuit 201 is 2.55 V. The output voltage ripple of the DC conversion circuit 201 is 121.76 times of the output voltage ripple of the DC conversion circuit 200, and an output current ripple of the DC conversion circuit 200 shown by, e.g. the curve S6 is also lower than an output current ripple of the DC conversion circuit 201. Accordingly, the DC conversion circuit 200 has lower current ripples.

Figure 3A:
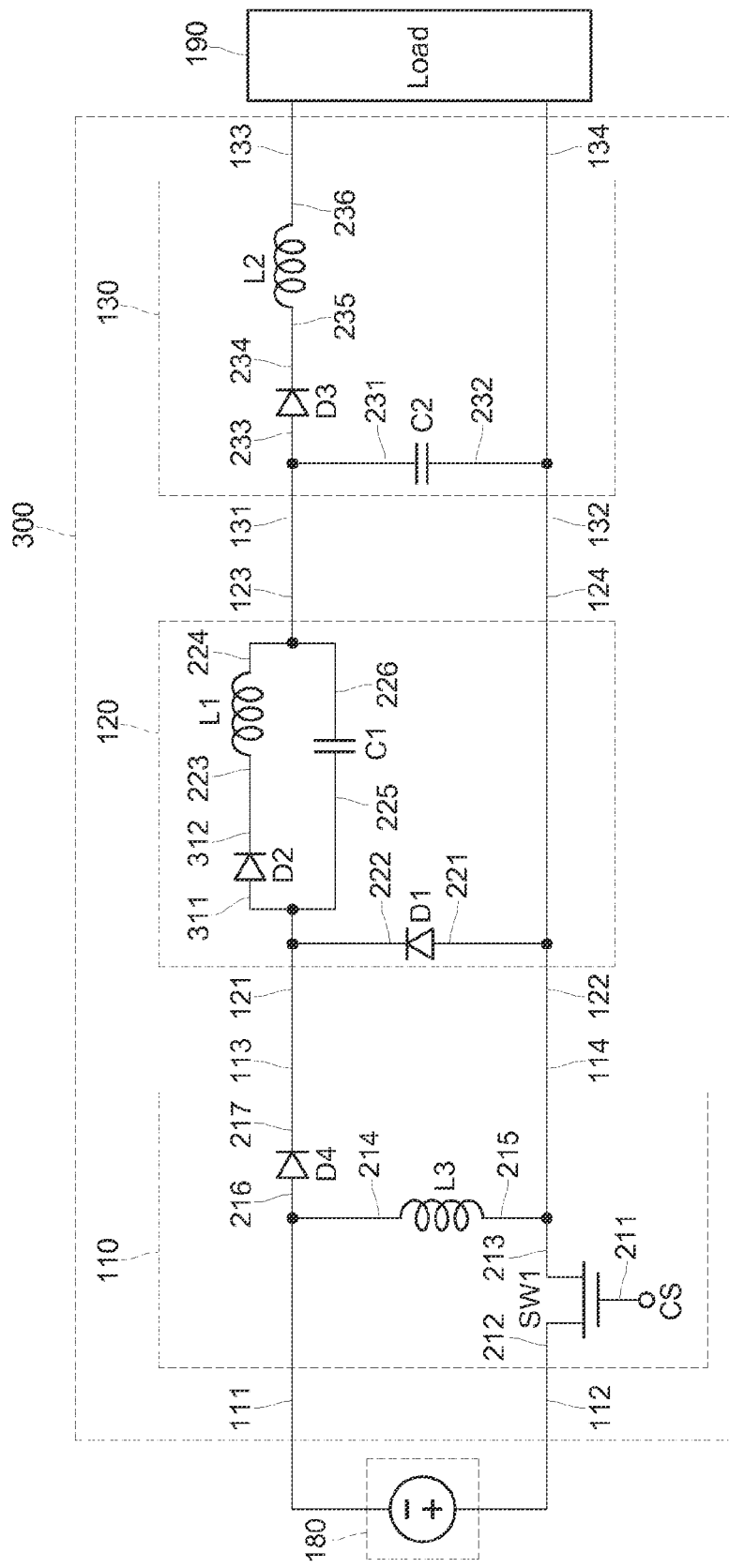
FIG. 3A is a schematic diagram of a DC conversion circuit according to a third embodiment of the disclosure.

FIG. 3A is a schematic diagram of a DC conversion circuit according to a third embodiment of the disclosure. The difference between a DC conversion circuit 300 of this embodiment and the DC conversion circuit 200 in FIG. 2A lies in that, the DC conversion circuit 300 of this embodiment further includes a second diode D2 disposed in the resonant stage circuit 120.

The second diode D2 has an anode end 311 and a cathode end 312. The second diode D2 is coupled between the cathode end 222 of the first diode D1 and the first end 223 of the first inductor L1. The anode end 311 of the second diode D2 is coupled to the cathode end 222 of the first diode D1. The cathode end 312 of the second diode D2 is coupled to the first end 223 of the first inductor L1. When the polarity of the voltage between the first and second ends 225 and 226 of the first capacitor C1 is reversed and when the negative voltage is formed to charge the first inductor L1, the second diode D2 is used for suppressing the negative voltage. Thus, the energy loss may be reduced, and the DC conversion circuit 300 may have better operating conditions.

Firstly, after the DC conversion circuit 300 starts to operate, the control signal CS is, for example, at the high logic level. Herein, the switch SW1 is turned on, and the DC conversion circuit 300 enters into the first mode. Thus, the first DC signal outputted by the DC input source 180 is transmitted to the third inductor L3 via the switch SW1, for charging the third inductor L3. On the other hand, the third diode D3 is conducted, and the second inductor L2 and the second capacitor C2 discharge the energy to the load 190.

Then, the control signal CS is switched to at the low logic level, so that the switch SW1 is turned off, and the DC conversion circuit 300 enters into the second mode.

Herein, the fourth diode D4 and the third diode D4 are conducted, and the energy stored in the third inductor L3 forms the second DC signal via the fourth diode D4. The second DC signal is transmitted to the first capacitor C1 for charging the first capacitor C1 and the second capacitor C2. In other words, the second DC signal (i.e. the energy stored in the third inductor L3) carries the stored energy to the second capacitor C2 via the first capacitor C1 speedily. This may effectively suppress the output current ripple caused by the increased input energy.

Subsequently, when the second diode D2 is conducted, the DC conversion circuit 300 enters into the third mode. Herein, the second direct current signal is further transmitted to the first inductor L1, besides the first capacitor C1. That is, the second DC signal carries the stored energy to the second capacitor C2 and to the second inductor L2 via the resonant circuit formed by the first inductor L1 and the first capacitor C1. The second capacitor C2 and the second inductor L2 transfer the stored energy to the load 190 for supplying the operating voltage required by the load 190.

When the energy stored in the third inductor L3 has discharged completely, the DC conversion circuit 300 enters into the fourth mode. Herein, resonance occurs in the first capacitor C1 and the first inductor L1 continuously for transmitting the stored energy to the second capacitor C2 and the second inductor L2. Thus, the second capacitor C2 and the second inductor L2 can continue to transfer the stored energy to the load 190 for supplying the operating voltage required by the load 190.

Subsequently, the polarity of the voltage between the first and second ends 225 and 226 of the first capacitor C1 is reversed, the negative voltage is formed. Herein, the third diode D3 is conducted, and the circuit structure of the DC conversion circuit 300 is changed. When the third diode D3 is conducted, the DC conversion circuit 300 enters into the fifth mode. Herein, the first capacitor C1 and the first inductor L1 form a loop via the third diode D3. The loop cooperates with the second capacitor C2 and the second inductor L2 to transmit the stored energy to the load 190 for supplying the operating voltage required by the load 190.

When the energy stored in the resonant circuit formed by the first inductor L1 and the first capacitor C1 has been discharged completely, the DC conversion circuit 300 enters into a sixth mode. Herein, only the second capacitor C2 and the second inductor L2 transfer the stored energy to the load 190 continuously for supplying the operating voltage required by the load 190. Accordingly, the DC conversion circuit 300 has completed a full cycle of actions.

The capacitance value of the first capacitor C1 can be designed to be smaller than that of the second capacitor C2, so that when the polarity of the voltage between the first and second ends 225 and 226 of the first capacitor C1 is reversed, the negative voltage between the first and second ends 225 and 226 of the first capacitor C1 will be larger than the voltage between the first and second ends 231 and 232 of the second capacitor C2. Herein, the first diode D1 will be turned on.

The aforementioned circuit structures of the buck-boost converter 110, the resonant stage circuit 120 and the output stage circuit 130 in FIG. 2A and FIG. 3 are used for illustrating various embodiments in the disclosure but not limiting the disclosure. More embodiments for the buck-boost converter 110, the resonant stage circuit 120 and the output stage circuit 130 are described as follows.

FIG. 3B is a schematic diagram of a resonant stage circuit according to an embodiment of the disclosure. The difference between the resonant stage circuit 120 of this embodiment and the resonant stage circuit 120 in FIG. 2A lies in that, the resonant stage circuit 120 of this embodiment further includes a second diode D5.

The second diode D5 has an anode end 321 and a cathode end 322. The second diode D5 is coupled between the second end 224 of the first inductor L1 and the output end 123 of the resonant stage circuit 120. The anode end 321 of the second diode D5 is coupled to the second end 224 of the first inductor L1. The cathode end 322 of the second diode D5 is coupled to the output end 123 of the resonant stage circuit 120. When the polarity of the voltage between the first and second ends 225 and 226 of the first capacitor C1 is reversed and when the negative voltage is formed to charge the first inductor L1, the second diode D5 is used for suppressing the negative voltage.

FIG. 4 is a schematic diagram of a resonant stage circuit according to an embodiment of the disclosure. The resonant stage circuit 120 includes a first diode D6, a first inductor L4 and a first capacitor C3. The first diode D6 has an anode end 411 and a cathode end 412. The cathode end 412 of the first diode D6 is coupled to the output end 113, i.e. the positive output end, of the buck-boost converter 110 and the input end 121 of the resonant stage circuit 120. The anode end 411 of the first diode D6 is coupled to the output end 114, i.e. the negative output end, of the buck-boost converter 110 and the input end 122 of the resonant stage circuit 120.

The first inductor L4 has a first end 413 and a second end 414. The first end 413 of the first inductor L4 is coupled to the anode end 411 of the first diode D6. The second end 414 of the first inductor L4 is coupled to the output end 124 of the resonant stage circuit 120.

The first capacitor C3 has a first end 415 and a second end 416. The first end 415 of the first capacitor C3 is coupled to the anode end 411 of the first diode D5. The second end 416 of the first capacitor C3 is coupled to the second end 414 of the first inductor L4. In this embodiment, the input end 121 of the resonant stage circuit 120 is directly coupled to the output end 123 of the resonant stage circuit 120.

FIG. 5A is a schematic diagram of a resonant stage circuit according to an embodiment of the disclosure. The difference between the resonant stage 120 of this embodiment and the resonant stage circuit 120 in FIG. 4 lies in that, the resonant stage circuit 120 of this embodiment further includes a second diode D7.

The second diode D7 has an anode end 512 and a cathode end 511. The second diode D7 is coupled between the anode end 411 of the first diode D6 and the first end 413 of the first inductor L4. The cathode end 511 of the second diode D7 is coupled to the anode end 411 of the first diode D6. The anode end 512 of the second diode D7 is coupled to the first end 413 of the first inductor L4.

FIG. 5B is a schematic diagram of a resonant stage circuit according to an embodiment of the disclosure. The difference between the resonant stage 120 of this embodiment and the resonant stage circuit 120 in FIG. 4 lies in that, the resonant stage circuit 120 of this embodiment further includes a second diode D8.

The second diode D8 has an anode end 522 and a cathode end 521. The second diode D8 is coupled between the second end 414 of the first inductor L4 and the output end 124 of the resonant stage circuit 120. The cathode end 511 of the second diode D7 is coupled to the second end 414 of the first inductor L4. The anode end 522 of the second diode D8 is coupled to the output end 124 of the resonant stage circuit 120.

Figure 6:
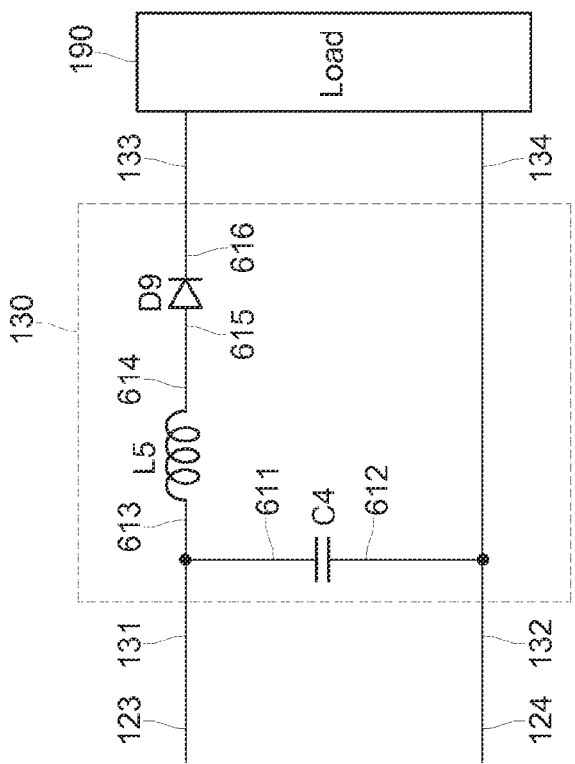
FIG. 6 is a schematic diagram of an output stage circuit according to an embodiment of the disclosure.

FIG. 6 is a schematic diagram of an output stage circuit according to an embodiment of the disclosure. The output stage circuit 130 includes a second capacitor C4, a second inductor L5 and a third diode D9. The second capacitor C4 has a first end 611 and a second end 612. The first end 611 of the second capacitor S4 is coupled to the output end 123 of the resonant stage circuit 120 and the input end 131 of the output stage circuit 130. The second end 412 of the second capacitor C4 is coupled to the output end 124 of the resonant stage circuit 120 and the input end 132 of the output stage circuit 130.

The second inductor L5 has a first end 613 and a second end 614. The first end 613 of the second inductor L5 is coupled to the first end 611 of the second capacitor C4. The third diode D9 has an anode end 615 and a cathode end 616. The anode end 615 of the third diode D9 is coupled to the second end 614 of the second inductor L5. The cathode end 616 of the third diode D9 is coupled to the output end 133 of the output stage circuit 130 and the load 190. In this embodiment, the output end 134 of the output stage circuit 130 is directly coupled to the input end 132 of the output stage circuit 130 and the load 190.

Figure 7:
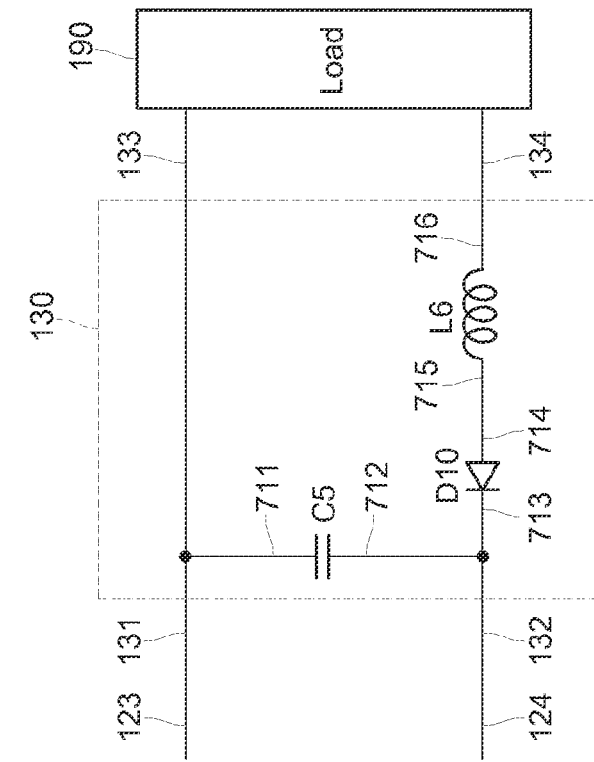
FIG. 7 is a schematic diagram of an output stage circuit according to an embodiment of the disclosure.

FIG. 7 is a schematic diagram of an output stage circuit according to an embodiment of the disclosure. The output stage circuit 130 includes a second capacitor C5, a third diode D10 and a second inductor L6.

The second capacitor C5 has a first end 711 and a second end 712. The first end 711 of the second capacitor C5 is coupled to the output end 123 of the resonant stage circuit 120 and the input end 131 of the output stage circuit 130. The second end 712 of the second capacitor C5 is coupled to the output end 124 of the resonant stage circuit 120 and the input end 132 of the output stage circuit 130.

The third diode D10 has an anode end 714 and a cathode end 713. The cathode end 713 of the third diode D10 is coupled to the second end 712 of the second capacitor C5. The second inductor L6 has a first end 715 and a second end 716. The first end 715 of the second inductor L6 is coupled to the anode end 714 of the third diode D10. The second end 716 of the second inductor L6 is coupled to the output end 134 of the output stage circuit and the load 190. In this embodiment, the input end 131 of the output stage circuit 130 is directly coupled to the output end 133 of the output stage circuit 130, and the output end 133 of the output stage circuit 130 is coupled to the load 190.

Figure 8:
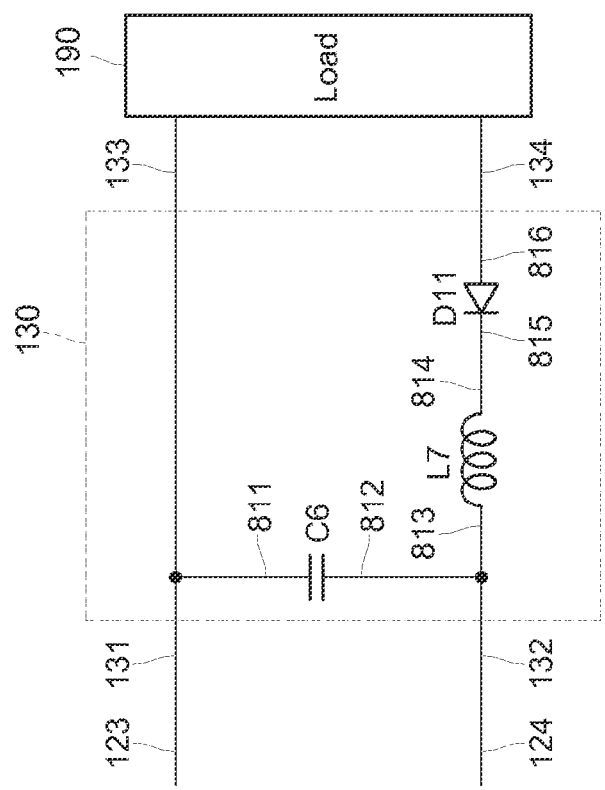
FIG. 8 is a schematic diagram of an output stage circuit according to an embodiment of the disclosure.

FIG. 8 is a schematic diagram of an output stage circuit according to an embodiment of the disclosure. The output stage circuit 130 includes a second capacitor C6, a second inductor L7 and a third diode D11. The second capacitor C6 has a first end 811 and a second end 812. The first end 811 of the second capacitor C6 is coupled to the output end 123 of the resonant stage circuit 120 and the input end 131 of the output stage circuit 130. The second end 812 of the second capacitor C6 is coupled to the output end 124 of the resonant stage circuit 120 and the input end 132 of the output stage circuit 130.

The second inductor L7 has a first end 813 and a second end 814. The first end 813 of the second inductor L7 is to the second end 812 of the second capacitor C6. The third diode D11 has an anode end 815 and a cathode end 816. The cathode end 816 of the third diode D11 is coupled to the second end 814 of the second inductor L7. The anode end 816 of the third diode D11 is coupled to the output end 134 of the output stage circuit 130 and the load 190. In this embodiment, the input end 131 of the output stage circuit 130 is directly coupled to the output end 133 of the output stage circuit 130, and the output end 133 of the output stage circuit 130 is coupled to the load 190.

Figure 9:
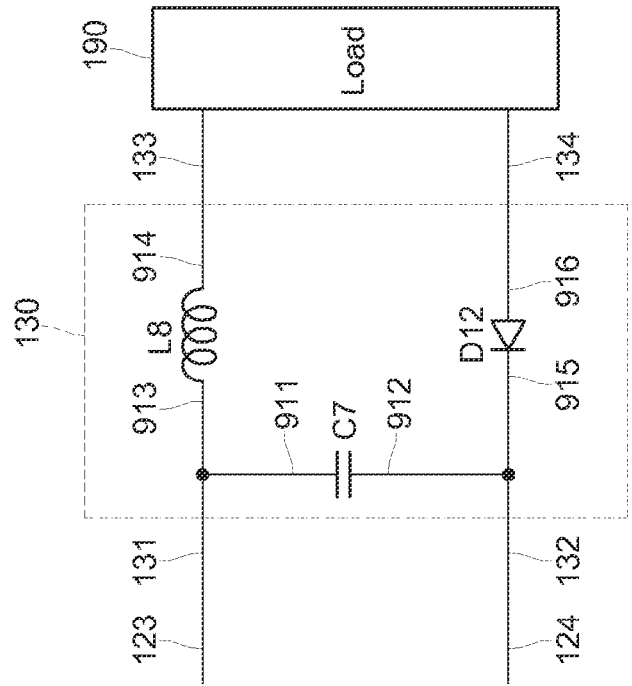
FIG. 9 is a schematic diagram of an output stage circuit according to an embodiment of the disclosure.

FIG. 9 is a schematic diagram of an output stage circuit according to an embodiment of the disclosure. The output stage circuit 130 includes a second capacitor C7, a second inductor L8 and a third diode D12.

The second capacitor C7 has a first end 911 and a second end 912. The first end 911 of the second capacitor C7 is coupled to the output end 123 of the resonant stage circuit 120 and the input end 131 of the output stage circuit 130. The second end 912 of the second capacitor C7 is coupled to the output end 124 of the resonant stage circuit 120 and the input end 132 of the output stage circuit 130.

The second inductor L8 has a first end 913 and a second end 914. The first end 913 of the second inductor L8 is coupled to the first end 911 of the second capacitor C7. The second end 914 of the second inductor L8 is coupled to the output end 133 of the output stage circuit 130 and the load 190. The third diode D12 has an anode end 916 and a cathode end 915. The cathode end 916 of the third diode D12 is coupled to the second end 912 of the second capacitor C7. The anode end 915 of the third diode D12 is coupled to the output end 134 of the output stage circuit 130 and the load 190.

Figure 10:
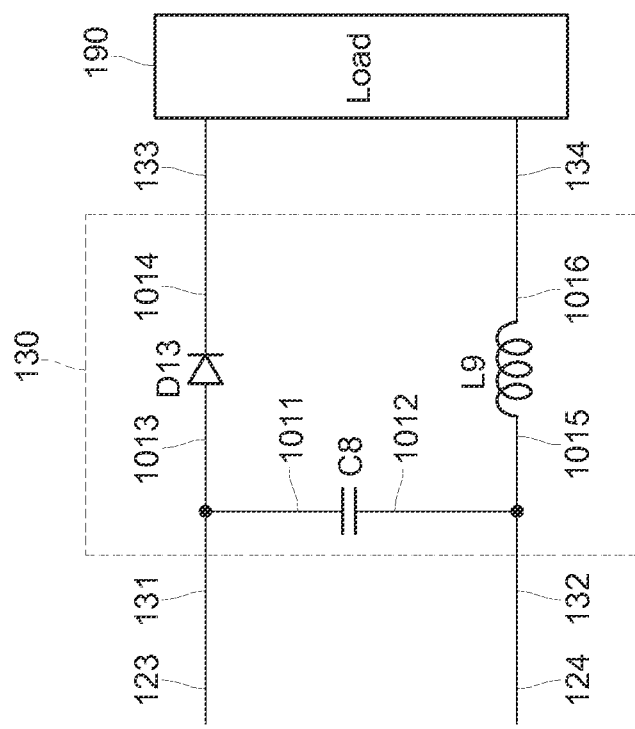
FIG. 10 is a schematic diagram of an output stage circuit according to an embodiment of the disclosure.

FIG. 10 is a schematic diagram of an output stage circuit according to an embodiment of the disclosure. The output stage circuit 130 includes a second capacitor C8, a third diode D13 and a second inductor L9. The second capacitor C8 has a first end 1011 and a second end 1012. The first end 1011 of the second capacitor C8 is coupled to the output end 124 of the resonant stage circuit 120 and the input end 131 of the output stage circuit 130. The second end 1012 of the second capacitor C8 is coupled to the output end 124 of the resonant stage circuit 120 and the input end 132 of the output stage circuit 130.

The third diode D13 has an anode end 1013 and a cathode end 1014. The anode end 1013 of the third diode D13 is coupled to the first end 1011 of the second capacitor C8. The cathode end 1014 of the third diode D13 is coupled to the output end 133 of the output stage circuit 130 and the load 190. The second inductor L9 has a first end 1015 and a second end 1016. The first end 1015 of the second inductor L9 is coupled to the second end 1012 of the second capacitor C8. The second end 1016 of the second inductor L9 is coupled to the output end 134 of the output stage circuit 130 and the load 190.

Figure 11:
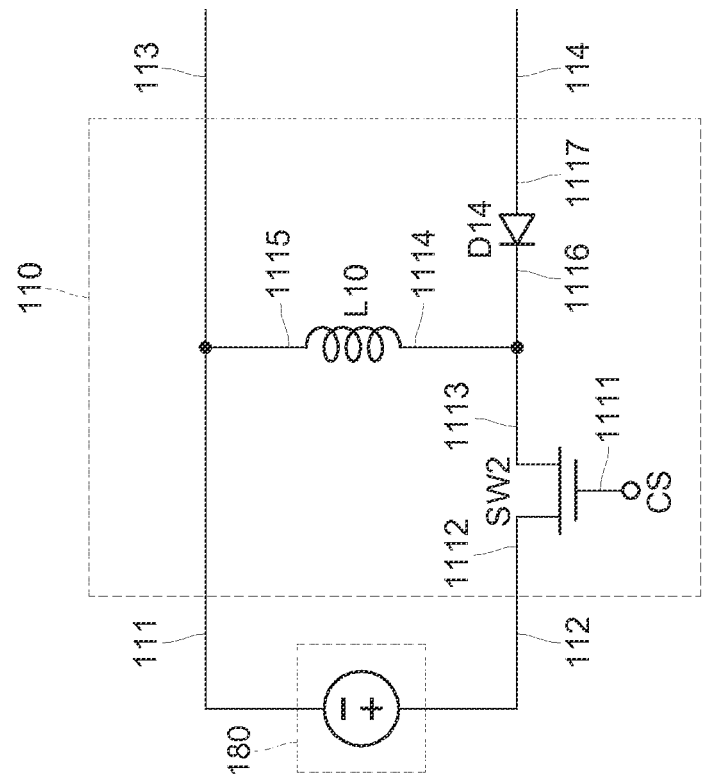
FIG. 11 is a schematic diagram of a buck-boost converter according to an embodiment of the disclosure.

FIG. 11 is a schematic diagram of a buck-boost converter according to an embodiment of the disclosure. The buck-boost converter 110 comprises a switch SW2, a third inductor L10 and a fourth diode D14.

The switch SW2 has a first end 1111, a second end 1112 and a third end 1113. The first end 1111 of the switch SW2 receives a control signal CS. The second end 1112 of the switch SW2 is coupled to the input end 112 of the buck-boost converter 110. The third inductor L10 has a first end 1141 and a second end 1115. The first end 1114 of the third inductor L10 is coupled to the third end 1113 of the switch SW2. The second end 1115 of the third inductor L10 is coupled to the input end 111 of the buck-boost converter 110 and the positive output end 113 of the buck-boost converter 110. The fourth diode D14 has an anode end 1117 and a cathode end 1116. The cathode end 1116 of the fourth diode D14 is coupled to the first end 1114 of the third inductor L10. The anode end 1117 of the fourth diode D14 is coupled to the output end 114 of the buck-boost converter 110.

Figure 12:
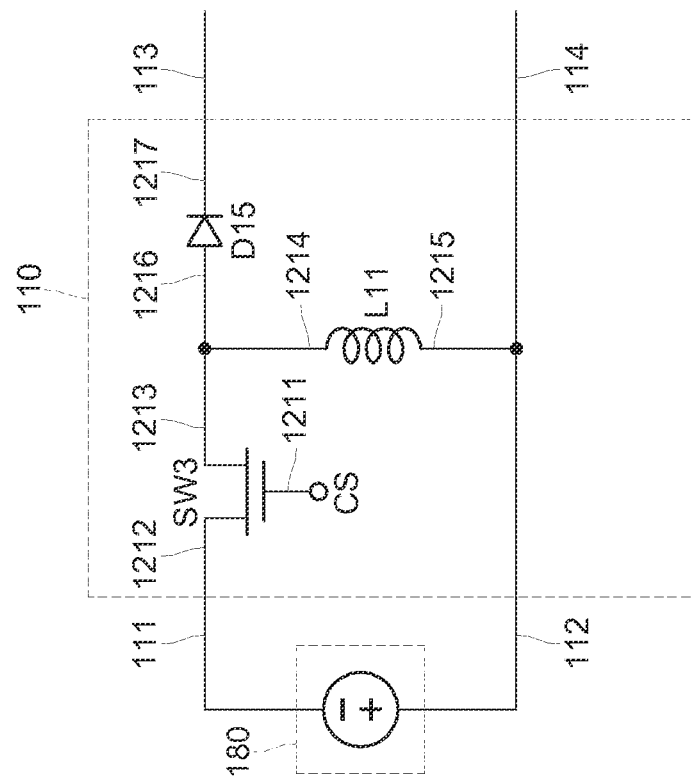
FIG. 12 is a schematic diagram of a buck-boost converter according to an embodiment of the disclosure.

FIG. 12 is a schematic diagram of a buck-boost converter according to an embodiment of the disclosure. The buck-boost converter 110 comprises a switch SW3, a third inductor L11 and a fourth diode D15.

The switch SW3 has a first end 1211, a second end 1212 and a third end 1213. The first end 1211 of the switch SW3 receives a control signal CS. The second end 1212 of the switch SW3 is coupled to the input end 111 of the buck-boost converter 110. The third inductor L11 has a first end 1214 and a second end 1215. The first end 1214 of the third inductor L11 is coupled to the third end 1213 of the switch SW3. The second end 1215 of the third inductor L11 is coupled to the input end 112 of the buck-boost converter 110 and the output end 114, i.e. the negative output end, of the buck-boost converter 110. The fourth diode D15 has an anode end 1216 and a cathode end 1217. The anode end 1216 of the fourth diode D15 is coupled to the first end 1214 of the third inductor L11. The cathode end 1217 of the fourth diode D15 is coupled to the output end 113, i.e. the positive output end, of the buck-boost converter 110.

Figure 13:
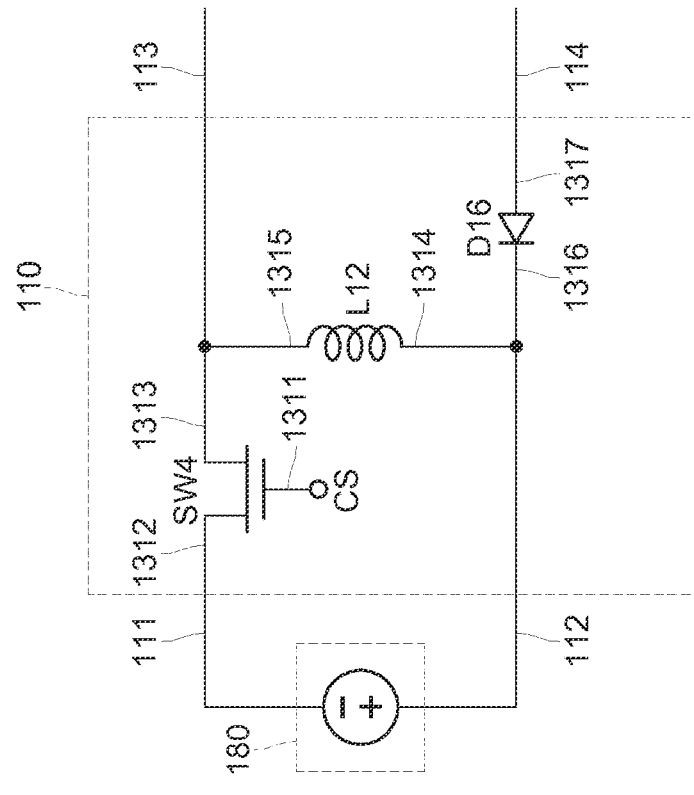
FIG. 13 is a schematic diagram of an output stage circuit according to an embodiment of the disclosure.

FIG. 13 is a schematic diagram of an output stage circuit according to an embodiment of the disclosure. The buck-boost converter 110 comprises a switch SW4, a third inductor L12 and a fourth diode D16.

The switch SW4 has a first end 1311, a second end 1312 and a third end 1313. The first end 1311 of the switch SW4 receives a control signal CS. The second end 1312 of the switch SW4 is coupled to the input end 111 of the buck-boost converter 110. The third end 1313 of the switch SW4 is coupled to the output end 113, i.e. the positive output end, of the buck-boost converter 110. The third inductor L12 has a first end 1314 and a second end 1315. The first end 1314 of the third inductor L12 is coupled to the input end 112 of the buck-boost converter 110. The second end 1315 of the third inductor L12 is coupled to the third end 1313 of the switch SW4. The fourth diode D16 has an anode end 1317 and a cathode end 1316. The cathode end 1316 of the fourth diode D16 is coupled to the first end 1314 of the third inductor L12. The anode end 1317 of the fourth diode D16 is coupled to the output end 114, i.e. the negative output end, of the buck-boost converter 110.

As set forth above, a person having ordinary skills in the art is allowed to vary the circuit structures of the buck-boost converter 110, the resonant stage circuit 120 and the output stage circuit 130 in FIG. 2A to FIG. 13 according to various applicative requirements to embody the DC conversion circuit 100 in the disclosure. The operation of the DC conversion circuit 100 according to various embodiments can refer to the aforementioned description of the embodiments in FIG. 2A and FIG. 3A, thereby being not described again hereinafter. Moreover, the DC conversion circuit 100 in every embodiment in the disclosure may have the faster input response, the smaller output current ripple and the longer life.

The DC conversion circuit of the disclosure including the buck-boost converter, the resonant stage circuit and the output stage circuit reverses the polarity of the voltage between the first and second ends of the first capacitor in the resonant stage circuit to form the negative voltage whereby a potential barrier of the load voltage may be overcome. Furthermore, the second diode can be disposed between the first diode and the first inductor in the resonant stage circuit, and the DC conversion circuit may have better operating conditions. Additionally, the first capacitor and the second capacitor with smaller capacitance values are employed instead of electrolyze capacitors. Therefore, the design may be made less complicated, and DC conversion circuit may have a faster input response, a smaller output current ripple as well as a longer life.

What is claimed is:

1. A direct current (DC) conversion circuit, adapted to drive a load which comprises a light emitting diode or an organic solid-state lighting, and comprising:
    a buck-boost converter having two input ends, a negative output end and a positive output end, the two input ends being used for receiving a first DC signal, and the negative and positive output ends being used for outputting a second DC signal;
    a resonant stage circuit having two input ends and two output ends, used for receiving the second DC signal by the two input ends of the resonant stage circuit, converting the second DC signal to energy, and outputting the energy by the two output ends of the resonant stage circuit, and further used for converting the energy to a negative voltage by a resonance effect and outputting the energy by the two output ends of the resonant stage circuit, wherein the resonant stage circuit comprises:
        a first diode having an anode end and a cathode end, the cathode end of the first diode being coupled to the positive output end of the buck-boost converter and one of the two input ends of the resonant stage circuit, and the anode end of the first diode being coupled to the negative output end of the buck-boost converter, the other one of the two input ends of the resonant stage circuit, and one of the two output ends of the resonant stage circuit; and
        a resonant tank having a first inductor and a first capacitor coupled in parallel, wherein the resonant tank is coupled between the cathode of the first diode and the other one of the two output ends of the resonant stage circuit; and
    an output stage circuit, having two input ends and two output ends, used for receiving the energy by the two input ends of the output stage circuit to store the energy and perform power charging, in order to output the energy to the load by the two output ends of the output stage circuit.

2. The DC conversion circuit as claimed in claim 1, wherein the resonant tank further comprises:
    a second diode having an anode end and a cathode end, the anode end of the second diode being connected to the cathode end of the first diode and the first capacitor, and the cathode end of the second diode being coupled to the first inductor.

3. The DC conversion circuit as claimed in claim 1, wherein the resonant tank further comprises:
    a second diode having an anode end and a cathode end, the anode end of the second diode being coupled between the first inductor, and the cathode end of the second diode being coupled to the other one of the two output ends of the resonant stage circuit and the first capacitor.

4. The DC conversion circuit as claimed in claim 1, wherein the output stage circuit comprises:
    a second capacitor having a first end and a second end, the first end of the second capacitor being coupled to the one of the two output ends of the resonant stage circuit and one of the two input ends of the output stage circuit, and the second end of the second capacitor being coupled to the other one of the two output ends of the resonant stage circuit and the other one of the two input ends of the output stage circuit;
    a third diode having an anode end and a cathode end, and the anode end of the third diode being coupled to the first end of the second capacitor; and
    a second inductor having a first end and a second end, the first end of the second inductor being coupled to the cathode end of the third diode, and the second end of the second inductor being coupled to one of the two output ends of the output stage circuit and the load;
    wherein the other one of the two output ends of the output stage circuit is directly coupled to the other one of the two input ends of the output stage circuit and the load.

5. The DC conversion circuit as claimed in claim 1, wherein the output stage circuit comprises:
    a second capacitor having a first end and a second end, the first end of the second capacitor being coupled to one of the two output ends of the resonant stage circuit and one of the two input ends of the output stage circuit, and the second end of the second capacitor being coupled to the other one of the two output ends of the resonant stage circuit and the other one of the two input ends of the output stage circuit;
    a second inductor having a first end and a second end, the first end of the second inductor being coupled to the first end of the second capacitor; and
    a third diode having an anode end and a cathode end, and the anode end of the third diode being coupled to the second end of the second inductor, and the cathode end of the third diode being coupled to one of the two output ends of the output stage circuit and the load;
    wherein the other one of the two output ends of the output stage circuit is directly coupled to the other one of the two input ends of the output stage circuit and the load.

6. The DC conversion circuit as claimed in claim 1, wherein one of the two the input ends of the output stage circuit is directly coupled to one of the two output ends of the output stage circuit, and the output stage circuit comprises:
    a second capacitor having a first end and a second end, the first end of the second capacitor being coupled to one of the two output ends of the resonant stage circuit and one of the two input ends of the output stage circuit, and the second end of the second capacitor being coupled to the other one of the two output ends of the resonant stage circuit and the other one of the two input ends of the output stage circuit;
    a third diode having an anode end and a cathode end, and the cathode end of the third diode being coupled to the second end of the second capacitor; and
    a second inductor having a first end and a second end, the first end of the second inductor being coupled to the anode end of the third diode, and the second end of the second inductor being coupled to the other one of the two output ends of the output stage circuit and the load;
    wherein the one of the two output ends of the output stage circuit is coupled to the load.

7. The DC conversion circuit as claimed in claim 1, wherein one of the two the input ends of the output stage circuit is directly coupled to one of the two output ends of the output stage circuit, and the output stage circuit comprises:
    a second capacitor having a first end and a second end, the first end of the second capacitor being coupled to one of the two output ends of the resonant stage circuit and one of the two input ends of the output stage circuit, and the second end of the second capacitor being coupled to the other one of the two output ends of the resonant stage circuit and the other one of the two input ends of the output stage circuit;

a second inductor having a first end and a second end, the first end of the second inductor being coupled to the second end of the second capacitor; and a third diode having an anode end and a cathode end, and the cathode end of the third diode being coupled to the second end of the second inductor, and the anode end of the third diode being coupled to the one of the two output ends of the output stage circuit and the load;

wherein the one of the two output ends of the output stage circuit is coupled to the load.

8. The DC conversion circuit as claimed in claim 1, wherein the output stage circuit comprises:

a second capacitor having a first end and a second end, the first end of the second capacitor being coupled to one of the two output ends of the resonant stage circuit and one of the two input ends of the output stage circuit, and the second end of the second capacitor being coupled to the other one of the two output ends of the resonant stage circuit and the other one of the two input ends of the output stage circuit;

a second inductor having a first end and a second end, the first end of the second inductor being coupled to the first end of the second capacitor, and the second end of the second inductor being coupled to one of the two output ends of the output stage circuit and the load; and a third diode having an anode end and a cathode end, the cathode end of the third diode being coupled to the second end of the second capacitor, and the anode end of the third diode being coupled to the other one of the two output ends of the output stage circuit and the load.

9. The DC conversion circuit as claimed in claim 1, wherein the output stage circuit comprises:

a second capacitor having a first end and a second end, the first end of the second capacitor being coupled to one of the two output ends of the resonant stage circuit and one of the two input ends of the output stage circuit, and the second end of the second capacitor being coupled to the other one of the two output ends of the resonant stage circuit and the other one of the two input ends of the output stage circuit;

a third diode having an anode end and a cathode end, the anode end of the third diode being coupled to the first end of the second capacitor, and the cathode end of the third diode being coupled to one of the two output ends of the output stage circuit and the load; and a second inductor having a first end and a second end, the first end of the second inductor being coupled to the second end of the second capacitor, and the second end of the second inductor being coupled to the other one of the two output ends of the output stage circuit and the load.

10. The DC conversion circuit as claimed in claim 1, wherein the first DC signal is a DC power source or a pulse power source.

11. The DC conversion circuit as claimed in claim 1, wherein the buck-boost converter comprises:

a switch having a first end, a second end and a third end, wherein the first end of the switch receives a control signal, the second end of the switch is coupled to one of the two input ends of the buck-boost converter, and the third end of the switch is coupled to the negative output end of the buck-boost converter;

a third inductor having a first end and a second end, wherein the first end of the third inductor is coupled to the other one of the two input ends of the buck-boost converter, and the second end of the third inductor is coupled to the third end of the switch; and a fourth diode having an anode end and a cathode end, wherein the anode end of the fourth diode is coupled to the first end of the third inductor, and the cathode end of the fourth diode is coupled to the positive output end of the buck-boost converter.

12. The DC conversion circuit as claimed in claim 1, wherein the buck-boost converter comprises:

a switch having a first end, a second end and a third end, wherein the first end of the switch receives a control signal, the second end of the switch is coupled to one of the two input ends of the buck-boost converter;

a third inductor having a first end and a second end, wherein the first end of the third inductor is coupled to the third end of the switch and the second end of the third inductor is coupled to the other one of the two input ends of the buck-boost converter and the positive output end of the buck-boost converter; and a fourth diode having an anode end and a cathode end, wherein the cathode end of the fourth diode is coupled to the first end of the third inductor, and the anode end of the fourth diode is coupled to the negative output end of the buck-boost converter.

13. The DC conversion circuit as claimed in claim 1, wherein the buck-boost converter comprises:

a switch having a first end, a second end and a third end, wherein the first end of the switch receives a control signal, the second end of the switch is coupled to one of the two input ends of the buck-boost converter;

a third inductor having a first end and a second end, wherein the first end of the third inductor is coupled to the third end of the switch and the second end of the third inductor is coupled to the other one of the two input ends of the buck-boost converter and the negative output end of the buck-boost converter; and a fourth diode having an anode end and a cathode end, wherein the anode end of the fourth diode is coupled to the first end of the third inductor, and the cathode end of the fourth diode is coupled to the positive output end of the buck-boost converter.

14. The DC conversion circuit as claimed in claim 1, wherein the buck-boost converter comprises:

a switch having a first end, a second end and a third end, wherein the first end of the switch receives a control signal, the second end of the switch is coupled to one of the two input ends of the buck-boost converter, and the third end of the switch is coupled to the positive output end of the buck-boost converter;

a third inductor having a first end and a second end, wherein the first end of the third inductor is coupled to the other one of the two input ends of the buck-boost converter, and the second end of the third inductor is coupled to the third end of the switch; and a fourth diode having an anode end and a cathode end, wherein the cathode end of the fourth diode is coupled to the first end of the third inductor, and the anode end of the fourth diode is coupled to the negative output end of the buck-boost converter.

15. A direct current (DC) conversion circuit, adapted to drive a load which comprises a light emitting diode or an organic solid-state lighting, and comprising:

a buck-boost converter having two input ends, a negative output end and a positive output end, the two input ends being used for receiving a first DC signal, and the negative and positive output ends being used for outputting a second DC signal;

a resonant stage circuit having two input ends and two output ends, used for receiving the second DC signal by the two input ends of the resonant stage circuit, converting the second DC signal to energy, and outputting the energy by the two output ends of the resonant stage circuit, and further used for converting the energy to a negative voltage by a resonance effect and outputting the energy by the two output ends of the resonant stage circuit, wherein the resonant stage circuit comprises:

a first diode having an anode end and a cathode end, the cathode end of the first diode being coupled to the positive output end of the buck-boost converter, the one of the two input ends of the resonant stage circuit and one of the two output ends of the resonant stage circuit, and the anode end of the first diode being coupled to the negative output end of the buck-boost converter and the other one of the two input ends of the resonant stage circuit; and a resonant tank having a first inductor and a first capacitor coupled in parallel, wherein the resonant tank is coupled between the anode of the first diode and the other one of the two output ends of the resonant stage circuit; and an output stage circuit, having two input ends and two output ends, used for receiving the energy by the two input ends of the output stage circuit to store the energy and perform power charging, in order to output the energy to the load by the two output ends of the output stage circuit.

16. The DC conversion circuit as claimed in claim 15, wherein the resonant tank further comprises:

a second diode having an anode end and a cathode end, the cathode end of the second diode being coupled to the anode end of the first diode and the first capacitor, and the anode end of the second diode being coupled to the first inductor.

17. The DC conversion circuit as claimed in claim 15, wherein the resonant tank further comprises:

a second diode having an anode end and a cathode end, the cathode end of the second diode being coupled to the first inductor, and the anode end of the second diode being coupled to the other one of the two output ends of the resonant stage circuit and the first capacitor.

* * * * *